United States Patent [19]

Specht et al.

[11] Patent Number: 5,749,536
[45] Date of Patent: May 12, 1998

[54] COUPLING FOR TORQUE TRANSFER FROM A PROPELLANT-OPERATED ROTARY DRIVE, ON A BELT SHAFT OF A SEAT BELT RETRACTOR FOR TENSIONING A SEAT BELT

[75] Inventors: Martin Specht, Feldafing; Walter Krauss, München, both of Germany

[73] Assignee: TRW Occupant Restraint Systems GmbH, Alfdorf, Germany

[21] Appl. No.: 750,371

[22] PCT Filed: Apr. 10, 1996

[86] PCT No.: PCT/EP96/01538

§ 371 Date: Dec. 10, 1996

§ 102(e) Date: Dec. 10, 1996

[87] PCT Pub. No.: WO96/32305

PCT Pub. Date: Oct. 17, 1996

[30] Foreign Application Priority Data

Apr. 10, 1995 [DE] Germany ............... 295 06 208 U

[51] Int. Cl.[6] .................................................. B60R 22/46
[52] U.S. Cl. ............................................................ 242/374
[58] Field of Search ............................ 242/374; 280/805, 280/806, 807

[56] References Cited

U.S. PATENT DOCUMENTS

| | | |
|---|---|---|
| 4,423,846 | 1/1984 | Fohl . |
| 4,455,000 | 6/1984 | Nilsson . |
| 5,114,090 | 5/1992 | Lindblad ................ 242/374 |
| 5,383,623 | 1/1995 | Hiruta et al. . |
| 5,451,008 | 9/1995 | Hamaue . |
| 5,681,004 | 10/1997 | Specht ................... 242/374 |

FOREIGN PATENT DOCUMENTS

| | | |
|---|---|---|
| 0529265 | 3/1993 | European Pat. Off. . |
| 0648652 | 4/1995 | European Pat. Off. . |
| 0673811 | 9/1995 | European Pat. Off. . |
| 35 31 856 A1 | 12/1986 | Germany ................ 280/806 |
| 38 09 829 A1 | 10/1989 | Germany ................ 280/806 |
| 3939233 | 5/1991 | Germany . |
| 4242784 | 7/1993 | Germany . |
| 29500807.5 | 4/1995 | Germany . |
| 4429731 | 2/1996 | Germany . |
| 2180734 | 4/1987 | United Kingdom . |
| 2 210 254 A | 6/1989 | United Kingdom ........ 280/806 |

*Primary Examiner*—John P. Darling
*Attorney, Agent, or Firm*—Tarolli, Sundheim, Covell, Tummino & Szabo

[57] ABSTRACT

A coupling for torque transfer from a drive operated by a propellant to a belt shaft 3 of a seat belt retractor for tensioning a seat belt includes a coupling element 2 maintained in the resting position in the uncoupled condition. The coupling element is supported by two different components 4, 5 with the aid of a carrier 1, a force having engaging effect being exerted by the carrier on the coupling element 2 due to the movement of the one component relative to the other.

21 Claims, 6 Drawing Sheets

5,749,536

COUPLING FOR TORQUE TRANSFER FROM A PROPELLANT-OPERATED ROTARY DRIVE, ON A BELT SHAFT OF A SEAT BELT RETRACTOR FOR TENSIONING A SEAT BELT

DESCRIPTION

The invention relates to a coupling for torque transfer from a propellant-operated rotary drive to a belt shaft of a seat belt retractor for tensioning a seat belt, including at least one coupling element maintained in the uncoupled condition in the resting status and which, for torque transfer in coupling engagement, is engaged with an engaging part connected to the belt shaft.

The object of the invention is to define such a coupling which ensures a compact configuration.

This object is achieved in accordance with the present invention in that the coupling element is swivably mounted on a component rotatively driven by the propellant and is maintained in the uncoupled condition by a retaining means and in that the coupling element is swivable into coupling engagement by a force generated by the propellant.

The propellant involved may be a drive medium, held in a stored energy operating mechanisms for example a compressed gas or a pyrotechnic propellant by which a compressed gas is generated on ignition. The rotary drive may be configued as a rotational drive as is described in EP 0 648 652 A1 or EP 0 673 811 A1. It may, however, also involve a sheave driven by a linear piston drive via an actuating cable as described for example in EP 0 529 265 A1 or GB 2 180 734 A1.

The coupling element may be swivelled into coupling engagement against a retaining force exerted by the retaining means, particularly a spring force. The effect of the force generated by the propellant is preferably terminated after the engaging action. The coupling element may be retained in the engaging position during torque transfer by a self-retaining force acting thereby between the engaging part and the coupling element. Preferably, the coupling element may be returned, after tensioning of the seat belt, into the uncoupled condition. As a result of which, the belt shaft on rotation, particularly in the webbing withdrawal direction, is released. Returning it into the uncoupled condition may be affected by spring force, particularly by the spring force generated by the retaining means.

For engaging the coupling in the engaging position especially the initial phase of the pressure build-up generated by the propellant is made use of. For example, the force furnished by the propellant may be converted into a movement for engaging the coupling element in the engaging movement indirectly by a relative movement being produced between two components driven by the propellant which affects a force acting on the coupling element in the direction of engagement. Furthermore, it is possible that the pressure generated by the propellant, particularly in the initial phase of pressure build-up, is caused to affect the coupling element directly so that it is pneumatically engaged from the resting position into the engaging position.

Preferably the retaining means comprises a carrier which takes the form of a spring, particularly a leaf spring. The carrier for the swivably mounted coupling element retains the coupling element in the normal condition in its resting position and returns the coupling element on completion of tensioning of the seat belt into its resting position.

In the case of the force generated kinematically by the relative movement of two components driven by the propellant and acting on the coupling element, it is preferably provided for that the two components, by which the coupling element is supported, feature differing angular velocities about an axis which preferably coincides with the belt shaft axis. Due to the differing angular velocities the retaining means or a part thereof, particularly the carrier, is moved so that a force is continuously exerted on the coupling element during the engaging action. The fastening points at which the coupling element is secured via the retaining means to the two components may be arranged at a specific angular spacing from each other about the belt shaft axis, this angular spacing being preferably approx. 180° or slightly more.

A suitable carrier is configured band-shaped and is bow-shaped. In the region of the bow, the coupling element may be mounted on the carrier.

The band-shaped carrier may be configured in such a way that it passes through the complete coupling element and is secured at its ends to the two components, it also being possible, however, that the band-shaped carrier connects the coupling element to one component and the coupling element is mounted, particularly swivable, at the other component. Preferably, in this case, the band-shaped carrier connects the coupling element to the slower rotating component, whilst the swivable mount of the coupling element is provided at the faster rotating component.

On engaging movement, due to the differing angular velocities, the carrier, particularly in the regions in which its extends from the coupling element up to the fastening points on both components, is capable of changing its shape so that as a result of the movement of the two components relative to each other an engaging movement is exerted on the coupling element due to the change in shape of the free carrier parts. In the case of the example embodiment with the swivable movement swivalling occurs due to the effect of the force.

Preferably, the engaging movement is directed from without radially inwards to the belt shaft axis.

The two components may be connected to each other in a force-transmitting manner, for example by gearing, this gearing generating the relative movement of the two components and, in particular, the differing angular velocities about the belt shaft axis. The two components may circulate coaxially about the belt shaft axis, it also being possible, however, that at least one the two components is mounted eccentrically with respect to the belt shaft axis, as a result of which likewise differing rotating speeds of the two components about the belt shaft axis are achieveable.

To simplify the coupling configuration the one component may be mounted on the other component.

During engagement, particularly after the coupling element has already engaged the part with which it is required to engage, the carrier function of the carrier and particularly the force exerted by the carrier on the coupling element may be annullated. On complete engagement at the latest, the carrier function or the force exterted by the carrier can be annullated, the return spring property being retained, however. This may be achieved, for instance, in that the carrier is provided at a location between the coupling element and one of two fastening points, particularly the fastening point provided at the the slower rotating component, for example at a designed weak point, at which it is designed to destruct, it also being possible that the fastening point itself is destructed.

In the case of the embodiment in which by direct means the engagement action is caused by pneumatically acting on the coupling element, substantially the same components are used as in the embodiments already described. Preferably, however, during the pressure effect on the coupling element the rotary driven components are maintained in the resting condition. This may be achieved, for instance, with the aid of a shear element, particularly of a shear pin which maintains one of the two rotary driven components in the initial phase of pressure build-up in the resting condition. In the case of a rotary piston drive, preferably the rotary piston is maintained in the resting position by the shear element. When the pressure build-up by the propellant exceeds a specific pressure value after a specific time period, during which the engagement of the coupling element in its engaging position is made, the shear element shears and rotary drive materializes. Preferably, the pressure is caused to effect the coupling element via coincident passages in the components driven by the propellant. When the components move at differing rotating speeds during the rotary drive the pressure passages are separated from each other, as in the case of a rotary valve, so that the pressure supply to the coupling element is interrupted. Thus, the application of pressure to the coupling element only occurs during engagement and is then interrupted. On completion of belt tensioning, the coupling element is again disengaged due to the spring force acting on the coupling element so that the winding shaft is freely rotatable, particularly in the direction of web withdrawal.

The invention will now be explained in more detail by way of example embodiments with respect to the drawing, in which.

Figure 4:
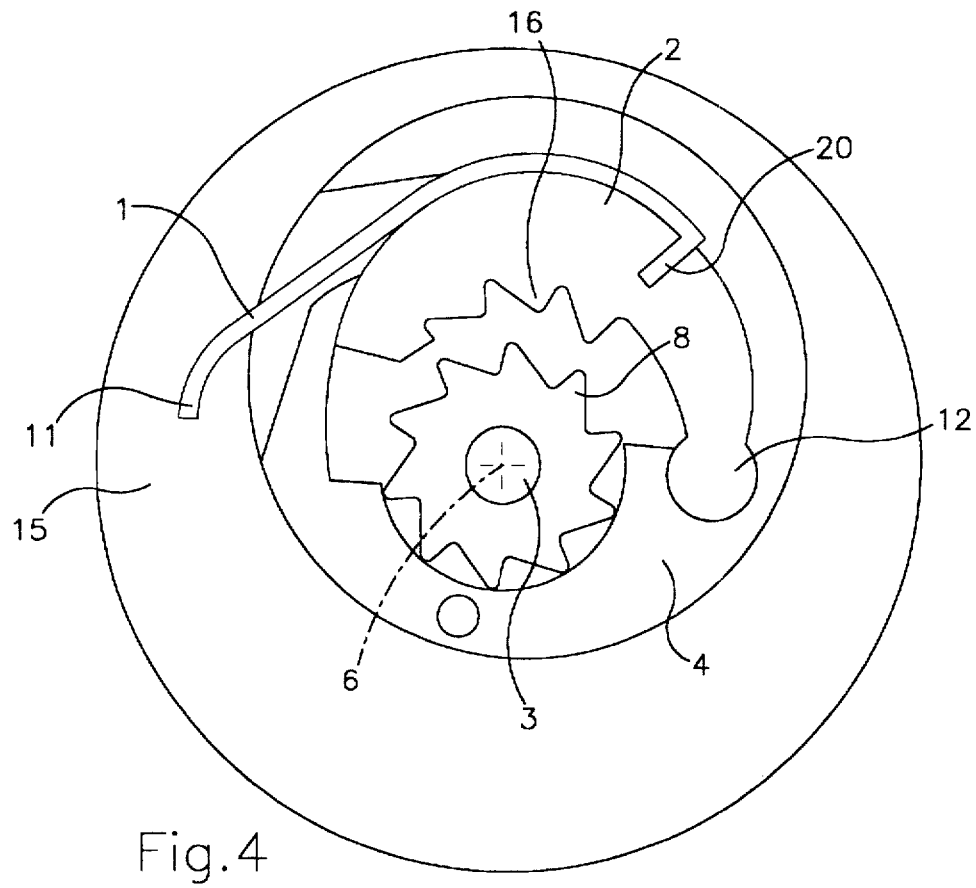
Figure 5:
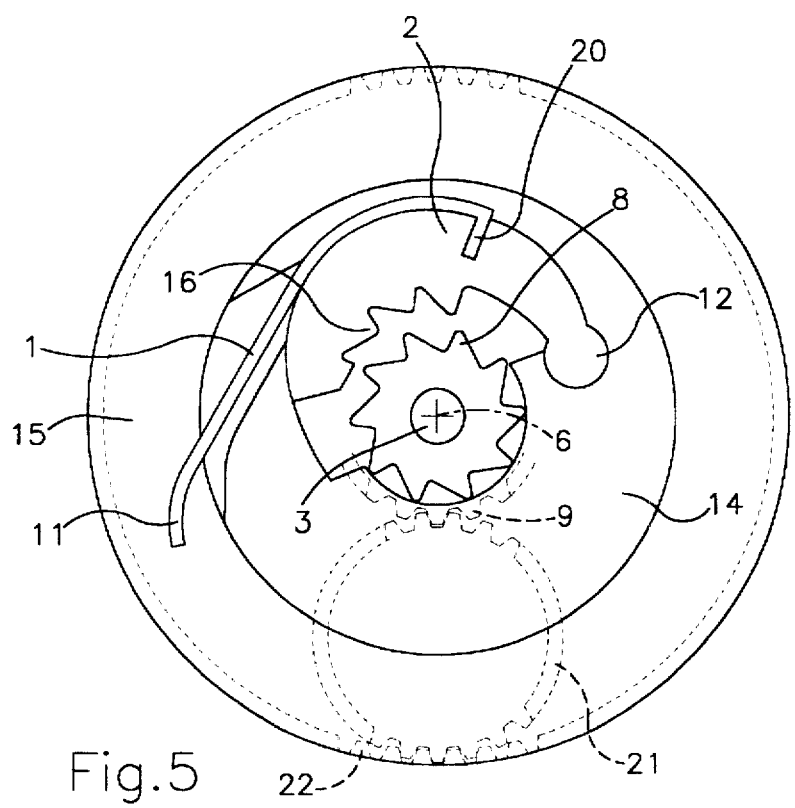

FIGS. 3 A–F: show various conditions of the engaging and disengaging action, sequenced in time;

FIG. 4 is a side view of a second embodiment;

FIG. 5 shows a third embodiment; and

Figure 6A:
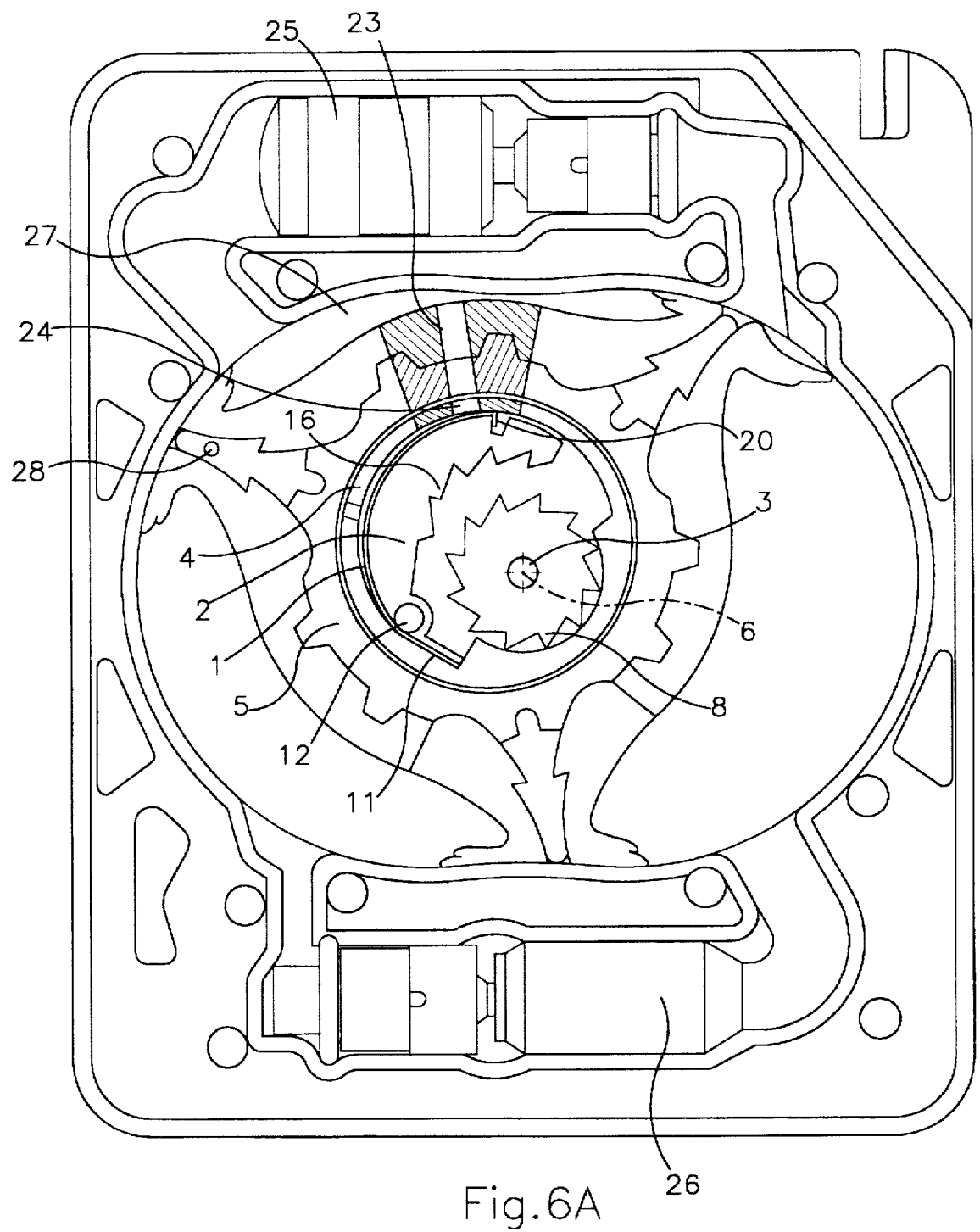
Figure 6B:
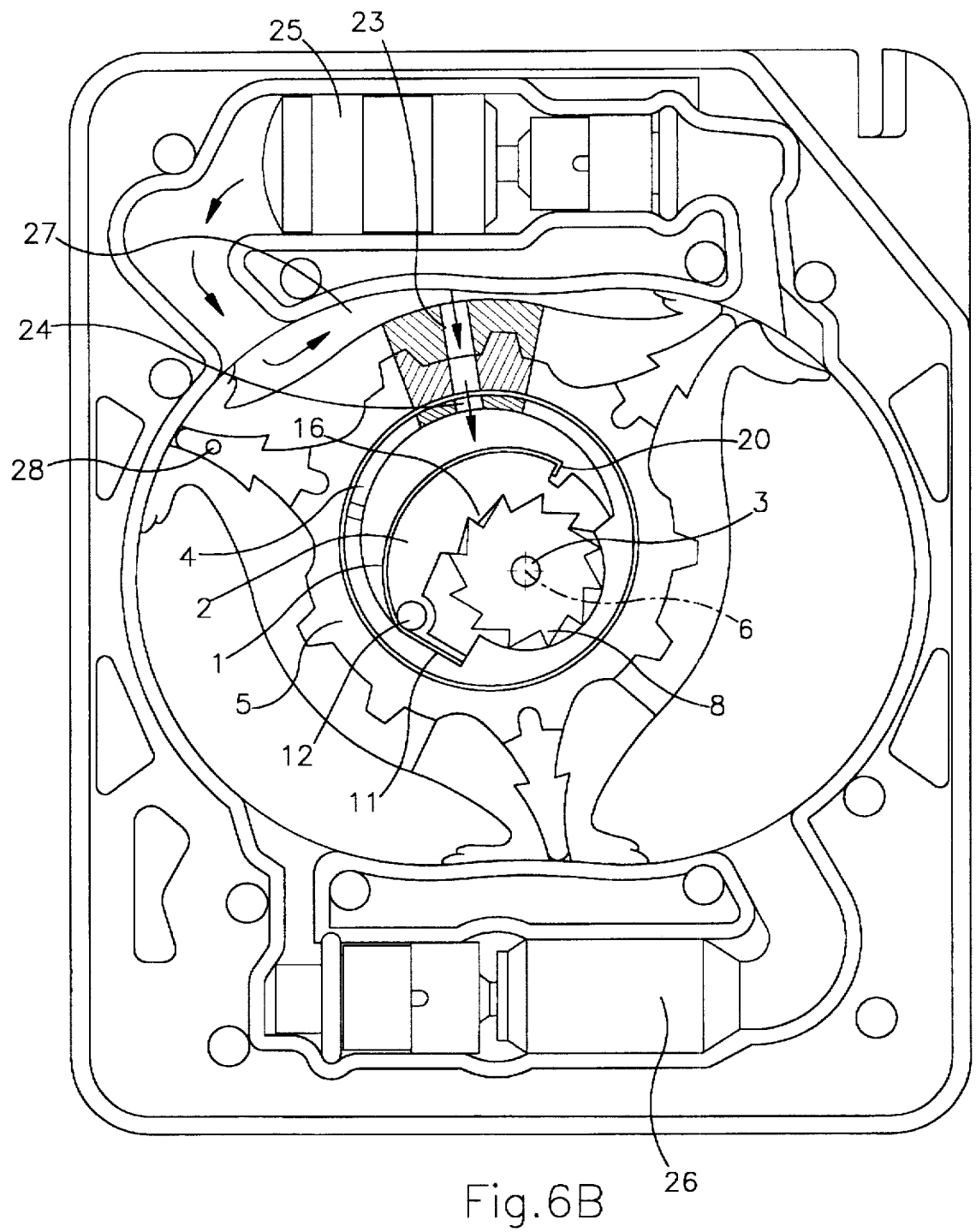

FIGS. 6 A–B show various operating positions of a fourth embodiment.

Figure 1:
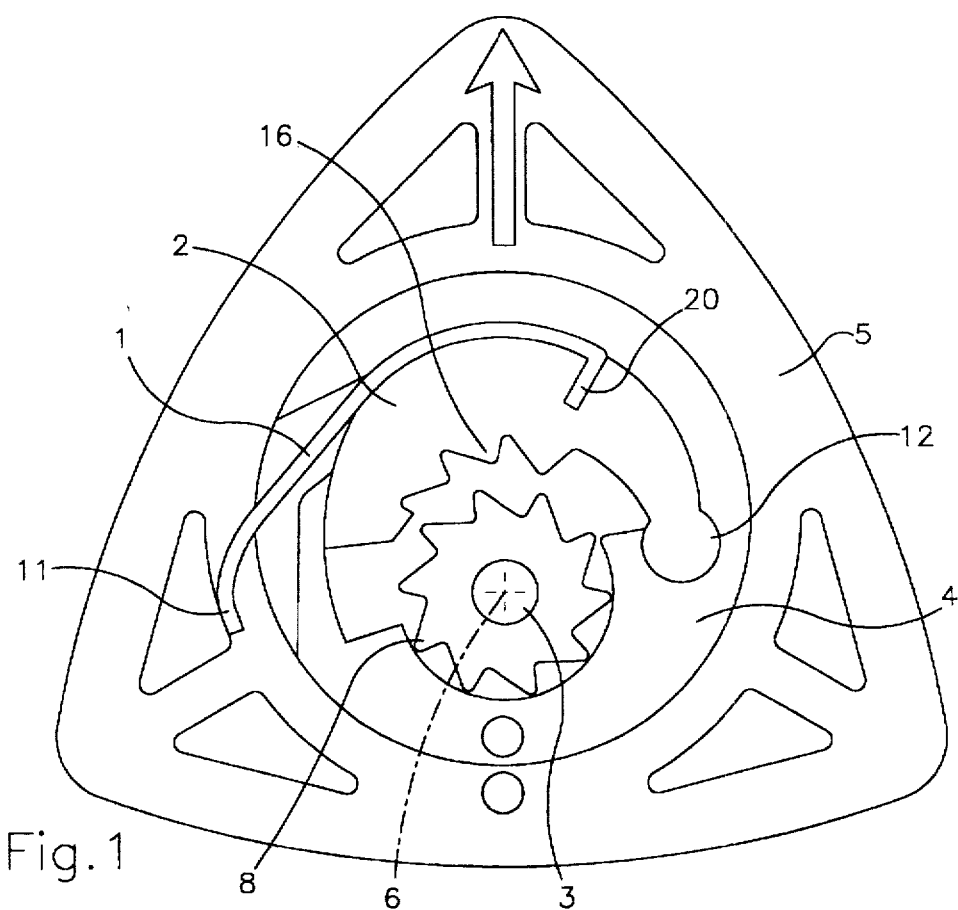
FIG. 1 is a side view of a first embodiment.
Figure 2:
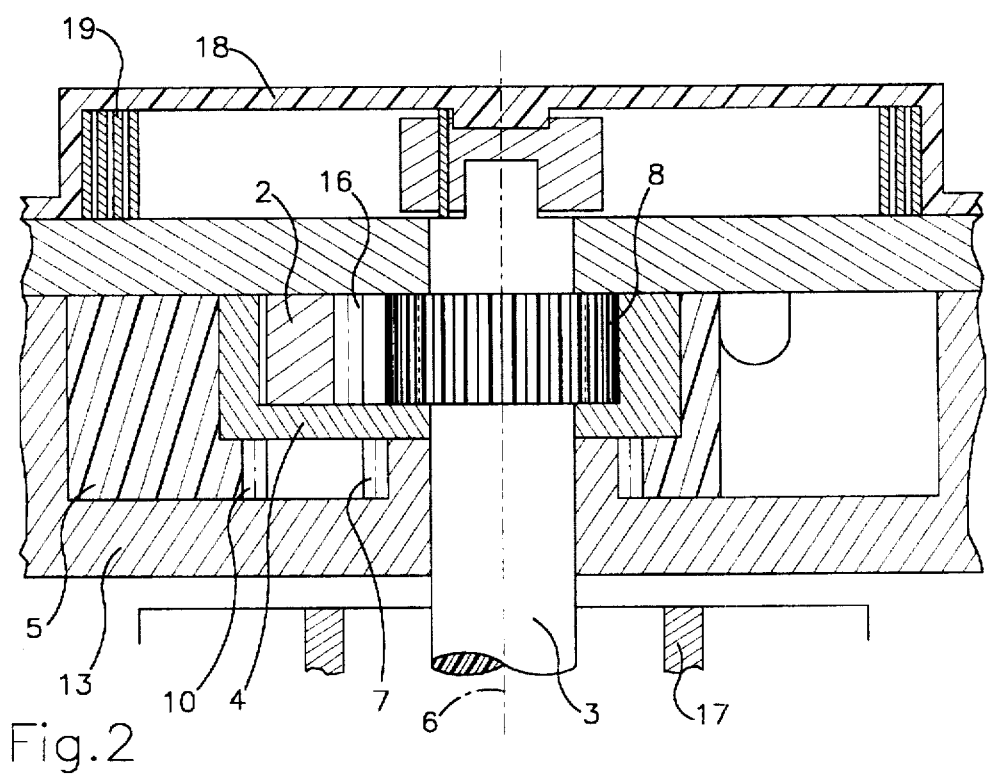
FIG. 2 is a section view of the embodiment shown in FIG. 1.
Figure 3C:
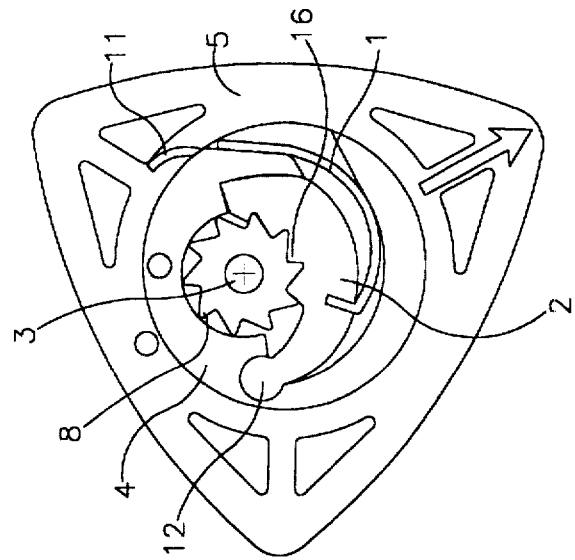
Figure 3B:
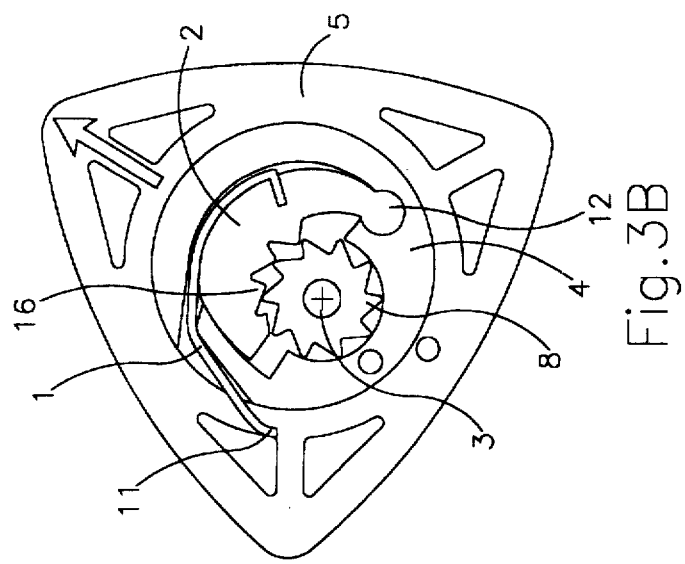
Figure 3A:
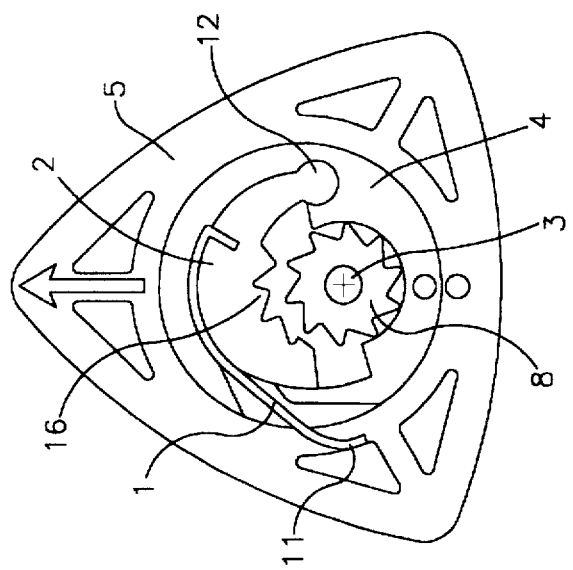
Figure 3F:
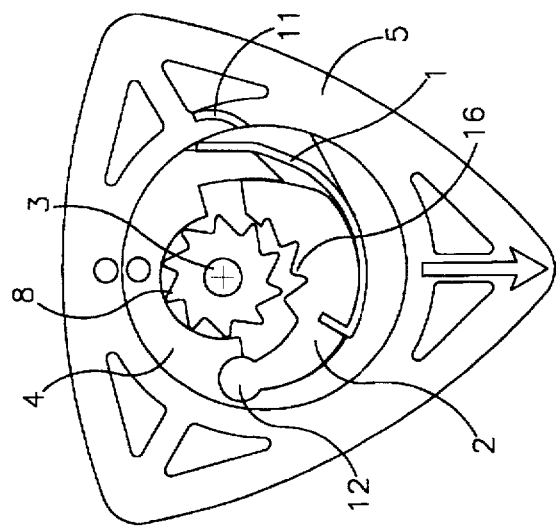
Figure 3E:
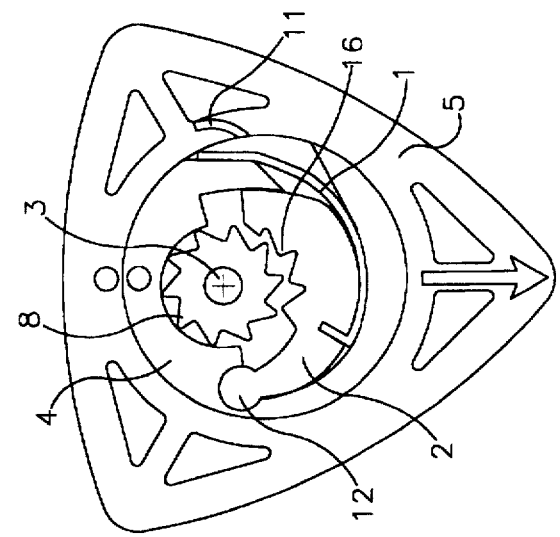
Figure 3D:
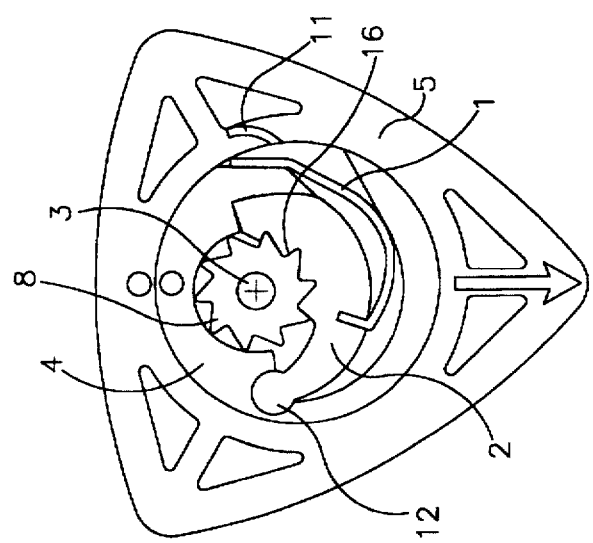

In the embodiment shown in FIGS. 1 to 3, the coupling is contained in a rotary drive configured as a rotary piston 5 which as the one component is mounted eccentrically with respect to the belt shaft axis 6 in a housing 13. One such rotary drive is described, for instance, in U.S. Pat. No. 5,681,004. The rotary piston 5 features an inner toothing 10 which engages a toothing 7 integral with the housing 13. The rotary piston 5 is further carried by the eccentric bracket 4. For this purpose, the eccentric bracket 4 has a cylindrical outer surface. The eccentric bracket 4 is furthermore rotatably mounted on the belt shaft 3, as is particularly evident from FIG. 2. The belt shaft 3 is provided with an outer toothing 8. This outer toothing 8 opposes a toothing 16 which is oriented radially inwards on the coupling element 2 configured in the fashion of an eccentric block. In the disengaged condition shown in FIG. 1, the belt shaft 3 is freely rotatable with respect to the coupling element 2 and thus with respect to the rotary drive. Provided on the belt shaft 3 is the belt reel 17 on which the seat belt is wound. On the other side of the rotary drive a spring cassette 18 incorporating a return spring 19 is provided which pretensions the belt reel 17 in the winding direction.

The coupling element 2 is supported by two different components which execute differing angular velocities about the belt shaft axis 6 in their driving action. For this purpose a band-shaped carrier 1 is employed which may be configured as a band of spring steel. The band-shaped carrier 1 is secured to a fastening point 11 in the rotary piston 5 which forms the one component having reduced angular velocity. The band-shaped carrier 1 is firmly connected at its other end to the coupling element 2 at a position 20 which forms a fixed connecting location. The coupling element 2 is movably, particularly swivably, connected at a fastening point 12 to the eccentric bracket 4 which forms the second component having particularly a higher angular velocity. Due to the fastening points 11 and 12 as well as the fixed hook-shaped connecting location 20 between coupling element 2 and band-shaped carrier 1 a retaining means for the coupling element 2 between two components is defined which on being driven rotate about the belt shaft axis 6 at differing angular velocities. The one component is formed by the rotary piston 5 and the other component by the eccentric bracket 4 arranged in the rotary piston 5.

When, for instance, the propellant, which may be configured pyrotechnical, is primed by a sensor means as a result of excessive vehicular acceleration or deceleration, the rotary piston 5 is driven by the propellant. Due to the piston rotation the eccentric bracket 4 is rotated at a speed about the axis of rotation which is higher than that of the rotary piston 5.

Due to the difference in the angular velocities of the eccentric bracket 4 and the rotary piston 5 the coupling element 2 is moved in the direction of the belt shaft axis 6 as is shown in the individual operating conditions of FIG. 3 (A), (B), (C).

On rotation the one end of the band-shaped carrier 1 is retained in the rotary piston 5 at the point 11 with a specified retaining force so that the band-shaped carrier 1 is deformed and exerts a force on the coupling element. Due to this force the coupling element 2 at the fastening point 12, forming a swivel axis, is swivelled so that its toothing 16 engages with the outer toothing 8 on the belt shaft 3. In FIG. 3 (A) the start of the engaging movement is shown, in FIG. 3 (B) an intermediate stage is shown, in which the two toothings 16 and 8 begin to engage each other, and in FIG. 3 (C) the final condition following engagement of the coupling element 2 with the toothing 8 of the belt shaft 3 is shown. The torque generated by the rotary piston 5 about the belt shaft axis 6 is transmitted via the eccentric bracket 4 and the coupling element 2 secured to the fastening point 12 on the eccentric bracket 4 to the belt shaft 3 and the belt reel 17, the band-shaped carrier 1 being totally distanced from the fastening point 11 on the rotary piston 5. The coupling element 2 is thus able to assume the angular velocity of the eccentric bracket 4 which is increased with respect to that of the rotary piston 5.

Should at the start of the engaging movement an unfavorable positioning of the toothing 8 on the belt shaft with respect to the toothing 16 on the coupling element 2 exist, to the extent that tooth clashing occurs, the force directed inwards, due to the relative twist of the eccentric bracket 4 with respect to the piston 5, is permanently exerted on the coupling element 2 so that then, when the two clashing teeth in further rotation of the eccentric bracket 4 move away from each other, the teeth of the toothing 16 are urged into the gaps of the toothing 8.

Evident from FIGS. 3 (D–F) is the disengaging of the coupling element 2 following the tensioning action. Due to the spring force of the band-shaped carrier 1 the coupling element 2 is returned from the engaged position depicted in FIG. 3 (D) on completion of the tensioning action in the direction of the initial position, as shown in FIG. 3 (E), whereby the disengaging movement may go so far as to cause the toothing 8 on the winding shaft und the toothing 16 on the coupling element 2 to move on each other on rotation of the winding shaft 3. However, the disengaging movement may go so far—as shown in FIG. 3 (F)—that the toothings 16 and 8 are totally separated from each other and a free rotation of the winding shaft 2 is possible.

In the example embodiments shown in FIGS. 4 and 5, the torque is transmitted to the belt shaft 3 by a rotor 15 rotatable about the belt shaft axis 6. The rotor 15 forming the one component may be a coupling disk which is caused to rotate by an actuating cable driven by the tensioning drive, as is known, for example, from EP 0 529 265 A1. The rotor may also be, however, a turbine wheel, Pelton wheel, or the like, rotatable about the belt shaft axis 6, the former being driven by a compressed gas or other drive medium.

In the example embodiment shown in FIG. 4, the eccentric bracket 4 is mounted eccentrically with respect to to belt shaft axis 6 in the rotor 15. This eccentric bracket forms the second component which executes a movement relative to the rotor 15 when the latter is driven. In the example embodiment shown in FIG. 4, this is achieved by the eccentric mounting of the eccentric bracket 4 on the belt shaft 3. In the example embodiment shown in FIG. 5, there is interposed between the rotor 15 and the second component 14, which is rotatable about the belt shaft axis 6 coaxially with the rotor 15, a gear, for example, a gearwheel 21. The gearwheel 21 meshes with an inner toothing 22 on the rotor 15 and a toothing 9 on the component 14 rotatable about the belt shaft axis 6, it being achieved in this way that the two components 14 and 15 rotate in opposing directions of rotation. The coupling element 2 is swivably mounted at the fastening point 12 in the component 14 as is the case in the embodiments of the FIGS. 1 to 4.

It is also possible to configure the embodiment of FIG. 5 in such a way that the component 15 is blocked and the gearwheel 21 is driven, like a planetary wheel, as is described in the German patent application P 44 29 731.9. In this arrangement the rotary drive, generated by the gearwheel 21 configured as a planetary wheel, is first used to engage the coupling element 2 in the toothing 8 of the belt shaft 3 and, with the coupling element 2 engaged, for tensioning drive of the belt shaft 3.

In the example embodiments described above, the force of the propellant is indirectly caused to affect the coupling element 2 to produce the engaging action by differing movements of the components 4, 5 (FIGS. 1 to 3) and 4, 15 (FIG. 4) as well as 14, 15 (FIG. 5) driven by the propellant and the resulting deformation of the carrier 1. In the embodiment shown in FIG. 6, a direct effect of the pressure generated by the propellant on the coupling element 2 materializes. The configuration of the embodiment of FIG. 6 is substantially the same as that of the embodiment of FIGS. 1 to 3, merely the carrier 1, which likewise may be configured in the form of a springable bent steel band, being defined by its fastening point 11 on the eccentric bracket 4. The fastening point 12 of the coupling element 2 configured as a swivel mount is likewise located on the eccentric bracket 4. As is particularly evident from FIG. 2, the eccentric bracket 4 is pot-shaped in configuration, the coupling element 2 being mounted with the carrier 1 inside the pot to make for a compact coupling configuration. The fastening point 12 configured as a swivel mount is located on the bottom of the pot. The fastening point 11 is located on the inner wall of the pot, and the hook-shaped fastening point 20, engaged by the springable carrier 1 on the coupling element 2, is located with respect to the winding shaft axis 6 at a location which has the angular spacing of an obtuse angle (e.g. approx. 140°) with respect to the swivel mount (fastening point 12).

In FIG. 6(A), the coupling is shown in its resting position during normal operation of the belt reel, the coupling element thereby being maintained out of engagement with the toothing 8 of the belt shaft 3 by the spring force of the carrier 1.

To couple the rotary drive featuring the rotary piston 5 to the belt shaft 17 for example in a crash situation the coupling element 2 needs to be swivelled about the fastening point 12 into the engagement position shown in FIG. 6 (B) the same as in the case of the embodiments previously explained, particularly as explained in FIG. 3 (A) to (D). For this purpose the propellant pressure generated by an inflator 25 is made use of. In the case of the inflator 25 particularly the inflator is involved as is described, for example, in EP 0 648 652 A1or EP 0 673 811 A1, which drives the rotary piston 5 of the rotary drive in its first driving phase. Following ignition of the inflator 25 an initial pressure is formed in a pressure space 27 into which the propellant gas generated by the inflator 25 flows, which acts on the coupling element 2 via a passage 23 in the rotary piston 5 and via a passage 24 in the eccentric bracket 4. This initial pressure generated by the inflator 25 is sufficient to overcome the restraining force of the carrier 1 and to engage the coupling element by its toothing 16 with the toothing 8 of the belt shaft 3, as is shown in FIGS. 3(A) to (D), until the position as shown in FIG. 6 (B) is attained.

During the engaging action the rotary piston 5 is retained at the housing wall with the aid of a shear element, for instance, a shear pin 28. The initial pressure phase generated by the inflator 25 is dimensioned so that it is sufficient to overcome the retaining force of the carrier 1 and to bring the coupling element 2 into the engagement position. The initial pressure is in this phase, however, still too low for the shear pin 28 to shear. This is why during engagement all movable components of the rotary drive, i.e. the rotary piston 5 and the eccentric bracket 4 are maintained in the resting position, thus ensuring that the two passages 23 and 24 remain in the shown coincident position during engaging action and that always the first tooth engages since clashing positions do not occur in a moved system.

On completion of engagement the pressure increases to such an extent that the shear element (shear pin 28) shears and due to the thereby resulting driving pressure the rotary piston 5 is caused to rotate, as is described, for example, in EP 0 648 652 A1 or EP 0 673 811 A1. Since, as explained in conjunction with the example embodiment of FIGS. 1 to 3, the rotary piston 5 and eccentric bracket 4 have differing speeds of rotation about the belt shaft axis 6, the two passages 23 and 24 are shifted out of alignment from each other so that any further pressure effect on the coupling element 2 by the propellant pressure generated by the inflator 25 is inhibited. The rotary drive rotates counterclockwise in FIG. 6. The pressure space 27 expands on rotation during which, in the influencing range of a second inflator 26, a new pressure space is created in which upon ignition of the inflator 26 likewise a propellant pressure is built up for continuing rotating of the rotary piston 5, as is described in EP 0 648 652 A1. During the rotary drive the coupling element 2 remains in the engagement position due to the self-maintaining force which is formed in the region of the two intermeshing toothings 8 and 16, so that the torque generated by the rotary drive is transmitted to the belt shaft 3 and the belt reel 17 for tensioning the belt webbing.

On completion of the tensioning action the coupling element 2 is returned into its resting position shown in FIG.

6 (A) due to the retaining force of the springable carrier 1. The belt reel 17 is then released and is freely rotatable.

In the case of the embodiments shown in FIGS. 4 and 5 too, direct pressure effects on the coupling element 2 can be achieved by coinciding the pressure passages in the components 4 and 15 (FIG. 4) and 14 and 15 (FIG. 5) as has already been described in conjunction with the embodiment of FIG. 6.

We claim:

1. A coupling for torque transfer from a propellant-operated rotary drive to a belt shaft of a seat belt retractor for tensioning a seat belt, said coupling comprising:

a first component which is rotatively driven by the rotary drive with a first angular velocity;

a second component which is operatively coupled to said first component for being driven thereby with a second angular velocity which is higher than said first angular velocity;

a coupling element pivotally mounted on said second component; and an engaging part connected to the belt shaft, said coupling element being displaceable between a rest condition in which said coupling element does not engage said engaging part and an engagement condition in which said coupling element engages said engaging part for torque transfer from said second component to said engaging part, said coupling element being retained in said rest condition by a retaining means which is overcome by a force generated upon activation of the rotary drive.

2. The coupling of claimed 1 wherein said retaining means comprises a carrier bearing at said first component and at said coupling element.

3. The coupling of claim 2 wherein said carrier is band-shaped, a first end of said carrier being frictionally connected to said first component at a first fastening point and a second end of said carrier being fixedly connected to said coupling element, said coupling element being pivotally mounted to said second component at a second fastening point.

4. The coupling of claim 3 wherein said carrier is bow-shaped.

5. The coupling of claim 3 wherein said carrier is resilient, said carrier biasing said coupling element into said rest condition.

6. The coupling of claim 3 wherein said first and second fastening points are arranged a distance apart, said distance increasing upon rotation of said first and second components against said retaining means, said first and second fastening points being located with respect to a pivot axis of said engaging part such that said coupling element is pivoted into said engagement condition when said distance increases.

7. The coupling of claim 6 wherein said first end of said carrier, due to said force generated upon activation of the rotary drive, is disconnected from said first fastening point when said coupling element is in said engagement condition.

8. The coupling of claim 1 wherein the force generated upon activation of the rotary drive is due to a gas pressure resulting from activation of a propellant charge, the gas pressure acting on said coupling element for transferring said coupling element from said rest condition into said engagement condition.

9. The coupling of claim 8 wherein said first and second components have passages which are coincident prior to activation of the rotary drive, said gas passages forming a fluid communication from the propellant charge to said coupling element.

10. The coupling of claim 9 wherein a shear element is provided for holding said first and second components stationary in a first phase of generation of the gas pressure.

11. The coupling of claim 10 wherein said passages are rotated relatively to one another after said shear element is sheared off and said first and second components are rotated relative to one another, whereby said fluid communication is interrupted and the gas pressure acting on said coupling element is maintained.

12. The coupling element of claim 11 wherein said coupling element is prevented from being subjected to any excessive gas pressure by said passages being displaced from its coincident arrangement after activation of the rotary drive.

13. The coupling of claim 1 wherein said coupling element is pivoted radially inwardly when transferring from said rest condition into said engagement condition.

14. The coupling of claim 1 wherein said coupling element and said engagement part are each provided with a toothing providing a self-retaining force effective during torque transfer.

15. The coupling of claim 1 wherein said coupling element and said engagement part are each provided with a toothing allowing said retaining means to return said coupling element into said rest condition after tensioning of the seat belt is terminated.

16. The coupling of claim 1 wherein said first and second components are arranged to rotate coaxially with the belt shaft.

17. The coupling of claim 1 wherein at least one of said first and second components is arranged for an eccentric rotation with respect to the belt shaft.

18. The coupling of claim 1 wherein said first component is mounted to said second component.

19. The coupling of claim 18 wherein said second component is mounted for rotation coaxially with the belt shaft and comprises a cylindrical outer surface mounted eccentrically with respect to the belt shaft, said first component being secured to said cylindrical outer surface.

20. The coupling of claim 19 wherein said second component is part of a rotary piston of the rotary drive.

21. The coupling of claim 20 wherein the rotary piston comprises an internal toothing meshing with a stationary toothing.

* * * * *